(12) United States Patent
Berglund et al.

(10) Patent No.: US 6,199,130 B1
(45) Date of Patent: Mar. 6, 2001

(54) CONCURRENT MAINTENANCE FOR PCI BASED DASD SUBSYSTEM WITH CONCURRENT MAINTENANCE MESSAGE BEING COMMUNICATED BETWEEN SPCN (SYSTEM POWER CONTROL NETWORK) AND I/O ADAPTER USING PCI BRIDGE

(75) Inventors: Neil Clair Berglund, Mantorville; Daniel Frank Moertl; Thomas James Osten, both of Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/090,387

(22) Filed: Jun. 4, 1998

(51) Int. Cl.[7] .............................. G06F 13/00; G06F 1/26; G06F 11/30
(52) U.S. Cl. .......................... 710/103; 710/100; 710/102; 710/110; 713/300; 713/340
(58) Field of Search .................................. 710/100, 102, 710/103, 110; 713/300, 340

(56) References Cited

U.S. PATENT DOCUMENTS

| | | | | |
|---|---|---|---|---|
| 4,459,655 | * | 7/1984 | Willemin | 364/132 |
| 4,901,232 | * | 2/1990 | Harrington et al. | 364/200 |
| 5,117,430 | | 5/1992 | Berglund . | |
| 5,386,567 | * | 1/1995 | Lien et al. | 395/700 |
| 5,774,640 | * | 6/1998 | Kurio | 395/182.02 |
| 5,793,987 | * | 8/1998 | Quackenbush et al. | 395/280 |
| 5,793,993 | * | 8/1998 | Broedner et al. | 395/306 |
| 5,812,821 | * | 9/1998 | Sugi et al. | 395/500 |
| 5,815,647 | * | 9/1998 | Buckland et al. | 395/182.01 |
| 5,819,052 | * | 10/1998 | Sonada | 395/293 |
| 5,875,308 | * | 2/1999 | Egan et al. | 395/283 |
| 5,875,310 | * | 2/1999 | Buckland et al. | 395/306 |
| 5,890,004 | * | 3/1999 | Poisner | 395/750.01 |
| 5,935,252 | * | 8/1999 | Berglund et al. | 713/300 |
| 6,014,319 | * | 1/2000 | Kuchta et al. | 361/788 |
| 6,044,411 | * | 3/2000 | Berglund et al. | 710/9 |

OTHER PUBLICATIONS

U.S. application No. 08/912,561, Berglund, filed Aug. 18, 1997.
U.S. application No. 08/912,403, Berglund et al., filed Aug. 18, 1997.
U.S. application No. 08/912,402, Berglund et al., filed Aug. 18, 1997.
U.S. application No. 08/971,687, Berglund et al., filed Nov. 17, 1997.

* cited by examiner

*Primary Examiner*—Thomas C. Lee
*Assistant Examiner*—Tanh Nguyen
(74) *Attorney, Agent, or Firm*—Christopher H. Lynt (57) ABSTRACT

In an electrical system, concurrent maintenance of a system component coupled to the system by an adapter on a first communications path is accomplished through the provision of a second communications path to a system power controller, so that concurrent maintenance is not dependent on communications over the first communications path. In particular, concurrent maintenance of a direct access storage device (DASD) coupled to a computer system through a small computer system interconnect (SCSI) bus, an input-output adapter (IOA), a peripheral component interconnect (PCI) bus and a PCI bridge circuit (PCIB), is enabled by providing a IIC serial, point-to-point signal path between the bridge circuit and a system power control network (SPCN) to coordinate quiescing of the SCSI buses and powering down of the DASD.

23 Claims, 6 Drawing Sheets

CONCURRENT MAINTENANCE FOR PCI BASED DASD SUBSYSTEM WITH CONCURRENT MAINTENANCE MESSAGE BEING COMMUNICATED BETWEEN SPCN (SYSTEM POWER CONTROL NETWORK) AND I/O ADAPTER USING PCI BRIDGE

BACKGROUND OF THE INVENTION

1. Field of the Invention

The invention relates to the field of computer system maintenance, and in particular, to concurrent maintenance of peripheral component interconnect (PCI) based direct access storage devices (DASD's, i.e., disk drives).

2. Background Information

Typical medium to large size computer systems include at least one backplane, which is essentially a connecting board having integrated wiring and bus slots or other connectors, for interconnecting various computer system circuits designed to connect to the backplane. The backplanes are used to connect input-output (I/O) circuits, also commonly referred to as adapters or controller cards, for use in interfacing peripheral devices, for example, direct access storage devices (DASD's, e.g., hard disk drives), to the rest of the computer system. These I/O circuits are generally disposed on modules or cards which have standard connectors for plug-in to the backplane at bus sockets or slots. This allows for easy maintenance including removal, servicing, upgrading and replacement by service personnel.

Typically an interface circuit card is used to couple a DASD parallel or serial input/output bus to the computer system bus via the backplane. In some systems, there may be one or more backplanes and/or enclosures dedicated to DASD's, and these are referred to herein as DASD backplanes and DASD towers, respectively. An example of such a system is the IBM AS/400 (IBM and AS/400 are registered trademarks of International Business Machines Corporation).

An AS/400 computer system, for example, in its multi-tower configuration, includes towers interconnected by at least one host system bus, and also interconnected by a control network called the system power control network (SPCN). A known system power control network (SPCN) is disclosed in U.S. Pat. No. 5,117,430, for example. The SPCN is a low volume serial network used, for instance, to monitor power conditions at a plurality of interconnected nodes in a multi-tower computer system.

Improvements in the SPCN are disclosed in co-pending application Ser. No. 08/912,561 (attorney docket RO997-083-IBM-101), Ser. No. 08/912,403 (attorney docket RO997-084-IBM-102) and Ser. No. 08/912,402 (attorney docket RO997-085-IBM-103), for example.

The SPCN may include one or more microprocessors which are operational to, for example, monitor the status of, and make occasional adjustments to, the power conditions at the respective computer system nodes. At system start-up or "initial program load" (IPL), the SPCN microprocessors gather computer system configuration information ahead of and independently of the computer system main communication paths.

Also known is a method and apparatus for correlating the physical locations of system components with their corresponding logical addresses using an SPCN, disclosed in Ser. No. 08/971,687 (attorney docket number RO997-154-IBM-108).

There are a variety of standard bus types and associated slot connectors currently in use in computer system backplanes, including serial and parallel versions of SCSI (Small Computer System Interconnect), and the currently popular PCI (Peripheral Component Interconnect), for example. Where a backplane includes primarily PCI type (slot) connections, it will be referred to herein as a PCI backplane. A PCI backplane has a host PCI bus integrated on the backplane, and includes at least one PCI bridge circuit (PCIB) which couples the local PCI slot connections thereon to the computer system host bus, and to any other local PCI buses/connections present, thereby "bridging" the buses. The computer system host bus could also be a PCI bus or another type of bus. It is possible for an SCSI-based I/O controller, which couples to a peripheral device over an SCSI bus, to be disposed on a card configured to plug-in to a PCI slot on a PCI backplane.

DASD's typically connect directly to either a serial or a parallel SCSI I/O bus. One possible DASD system configuration, therefore, includes one or more DASD's connected by an SCSI bus to an SCSI DASD I/O card, which is plugged into a PCI slot on a PCI backplane of an AS/400 computer system. This type of DASD configuration will be referred to as a PCI-based DASD configuration or subsystem herein.

In mid-range to high-end computer systems, such as the AS/400, it is highly advantageous to be able to perform a number of maintenance operations on the system while the system is still running, and these operations are referred to as concurrent maintenance (CM) operations. In particular, failed or failing DASD's (and related circuits) should be replaceable in a concurrent maintenance operation, but to do so requires the SCSI bus to be quiesced while the DASD device is powered down and removed, and a replacement reinstalled and powered on, in order to prevent errors and voltage transients that may affect other devices.

However, there is a need for a new method for accomplishing DASD concurrent maintenance with the aforementioned PCI-based DASD configurations because the methods used with prior configurations are generally inapplicable, impractical and/or too expensive as will now be explained.

The presently methodology of DASD concurrent maintenance employed, for example, in some versions of the AS/400 computer system, uses a proprietary communication protocol and connection "IOPSCAN" between SPCN and each of several input-output adapters in a I/O subsystem structure. However, this prior method will not work effectively in PCI-based DASD subsystems for the following reasons. In the IOPSCAN method, for a typical 14-slot PCI backplane, where an SCSI DASD controller card can plug into any slot, one IOPSCAN signal line per slot, or 14 signal lines are required. However, this requirement for IOPSCAN lines raises a non-compliance issue with the industry standard PCI bus connector, where all the connector pins are already defined. Compliance with the industry standard is, of course, a desirable design goal affecting compatibility with third-party products, for example.

In another solution to the problem, the American National Standard for Information Systems SCSI standard for Enclosure Services (ANSI's SES) identifies the use and connection of an SES microprocessor to the SCSI bus. The ANSI-SES specifies that the SCSI bus must download inclosure information and services to an SES processor on the SCSI bus. One of the possible uses identified is to issue commands through the SCSI bus (using SCSI Diagnostic Mode Pages) to the SES processor, directing some 10 pins on the processor to turn on/off FET's or regulators on a DASD backplane to power on/off the DASD for concurrent maintenance (CM) activities.

There is also an ANSI standard called SCSI Power Management, which identifies various SCSI commands that can be used to control various aspects of power consumed by a DASD, and includes the concept of powering the DASD completely on and off.

However, the above-mentioned ANSI solutions have some drawbacks and limitations which make them significantly less than optimal solutions. For example, it is possible that the reason for needing a DASD maintenance action may be that the SCSI bus itself is inoperative. Since the above ANSI solutions make use of the SCSI bus for signaling and control, they may not be able to effectively and efficiently handle concurrent maintenance in the situation where the SCSI bus is causing the fault.

Additionally, one SES processor is required for each SCSI bus, so that costs disadvantageously increase substantially with each SCSI bus added.

Therefore, a need exists for a way to implement concurrent maintenance in a PCI-based DASD subsystem which avoids the above drawbacks and limitations. A need exists for a way to implement DASD concurrent maintenance operations using existing and future PCI bridge structures, intelligent I/O adapters, and provide generally, system enclosure service type processes.

SUMMARY OF THE INVENTION

It is, therefore, a principal object of this invention to provide a method and apparatus for implementing concurrent maintenance of peripheral component interconnect (PCI) based direct access storage devices.

It is another object of the invention to provide a method and apparatus that solves the above mentioned problems so that concurrent maintenance of peripheral component interconnect (PCI) based direct access storage devices (DASD's) can be accomplished even when the DASD bus (SCSI) has failed, for example, and without causing non-compliance issues to be raised with industry PCI bus standards.

According to another aspect of the invention, a single SPCN controller can advantageously control all the devices within an enclosure, i.e., a frame or tower, resulting in a substantial cost reduction over other arrangements using system enclosure services (SES) processors. In order to achieve desired performance of DASD devices, the number of DASD's connected to a single SCSI bus is limited, for example, to five DASD's. An enclosure containing forty-five DASD's, for example, would therefore have nine SCSI buses. In other arrangements using SES processors, nine such processors would be required for the enclosure. According to this aspect of the invention, the functions performed by these nine SES processors are performed by one SPCN controller.

These and other objects of the present invention are accomplished by the method and apparatus disclosed herein.

According to an aspect of the invention, a system power control network connection is provided to the PCI bridge chip(s) on each PCI backplane containing DASD controllers. The connection may advantageously be through a simple serial two-wire bus, for example. The connections to a number of PCIB circuits and backplanes may be advantageously coupled to the system power control network processor through a multiplexer and bus controller, for example. Through such an interface structure, the system power control network can control turning on/off the DASD's to permit concurrent maintenance operations coordinated with the PCIB chips. An interface structure according to the invention avoids non-compliance with PCI industry standards and provides a robust concurrent maintenance capability, since the DASD bus is not relied on for communicating the concurrent maintenance operations.

The method and apparatus according to the invention advantageously uses existing SPCN hardware to connect to the PCI subsystem PCI bridge chips. This link allows an intelligent PCI subsystem, such as a DASD input/output adapter with input/output processor (IOA/IOP), to coordinate concurrent maintenance operations, such as quiescing the SCSI bus and powering on and off the DASD's, switching LED's (light emitting diodes), or controlling DASD interlock latching mechanisms, in order to accomplish robust DASD concurrent maintenance operations required by service personnel.

According to another aspect of the invention, the serial bus between SPCN and the PCI bridge chip in one exemplary embodiment is the industry standard I2C (IIC) bus.

According to an aspect of the invention, concurrent maintenance operation commands, e.g., powering on and off the DASD, are communicated between the system power control network and the PCI bridge chips through an address space in each bridge chip. The communication and coordination with the PCI bridge chips is implemented in that each PCI bridge chip acts as a serial RAM device which can be written to and read from by the system power control network. The serial communication path between the system power control network and a PCI bridge chip is implemented as a point-to-point interface with a single master and a single slave in an exemplary embodiment.

These and other aspects of the invention will become apparent from the detailed description set forth below.

DETAILED DESCRIPTION OF THE PREFERRED EMBODIMENTS

Figure 1:
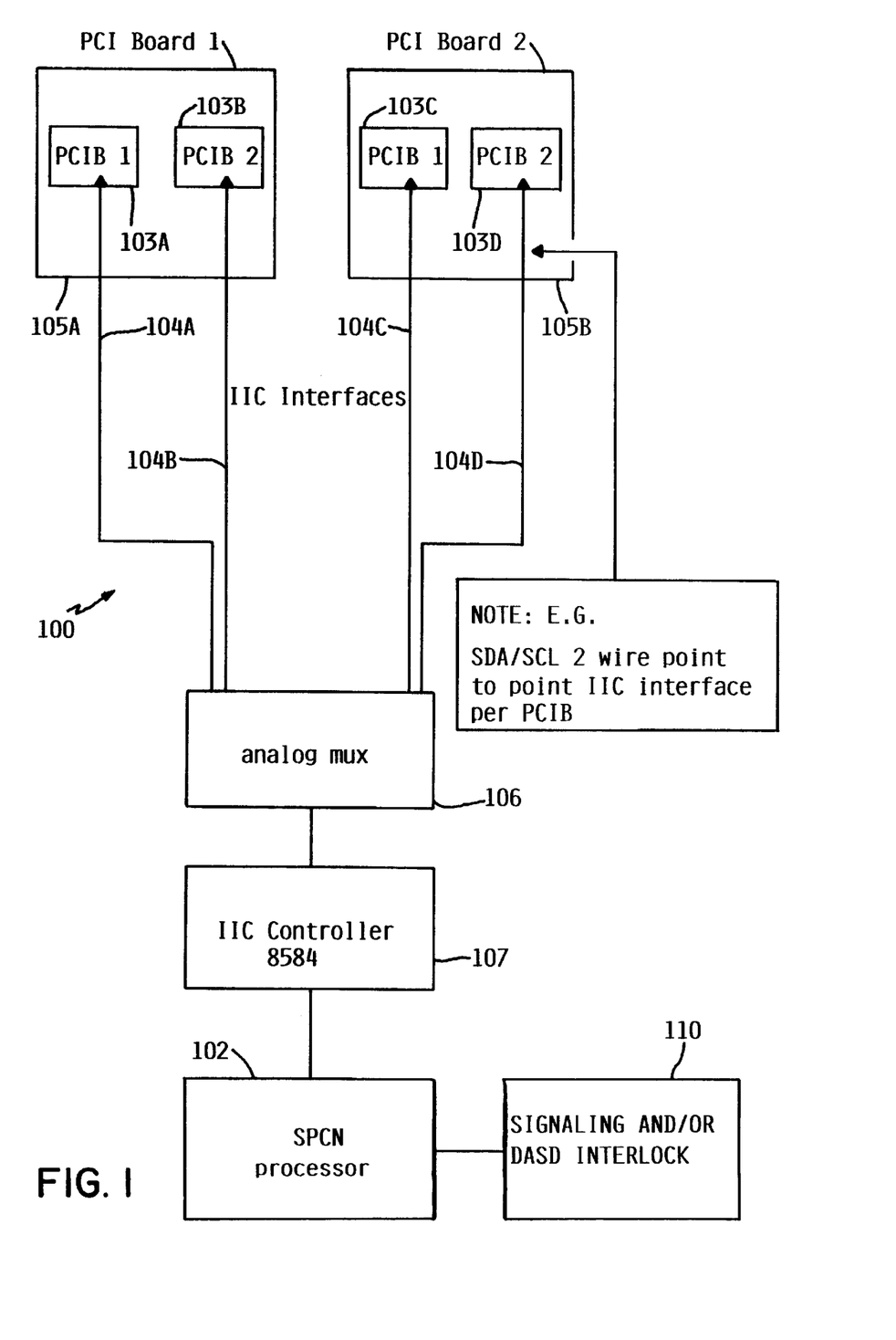
FIG. 1 illustrates a block diagram of an interface structure according to an exemplary embodiment of the present invention.

The invention will now be described in more detail by way of example with reference to the embodiments shown in the accompanying figures. It should be kept in mind that the following described embodiments are only presented by way of example and should not be construed as limiting the inventive concept to any particular physical configuration. FIG. 1 illustrates a block diagram of an interface structure 100 according to an exemplary embodiment of the present invention, in a computer system with two PCI boards, each having two bridge circuits. The invention of course is not limited to this number of boards/circuits and this number was chosen merely to simplify illustration and explanation.

FIG. 1 is a representation of an SPCN/PCIB IIC Interface, Physical Layer, that is, the physical interface between a system power controller, the system power control network SPCN, and each PCIB chip on each PCI Board in an enclosure or tower. The PCIB chips are exemplary PCI bridge circuits which were mentioned in the background section above. The PCI bridge circuits serve to couple system components, e.g., DASD input-output adapters processors and their adapters (IOP's and IOA's) to the host processor bus or system bus, which may also be a PCI bus.

In the illustrated system, the IOP and IOA make up a DASD controller. An IOP can control multiple IOA's and each IOA can source multiple SCSI buses. The DASD's are typically coupled to their IOA through an SCSI bus, as described earlier. Signaling and/or interlock mechanism 110 indicates/permits DASD concurrent maintenance.

As illustrated in FIG. 1, a system power control network processor 102 (SPCN processor) communicates with each bridge circuit 103A–103D on the PCI boards 105A and 105B, through a simple point-to-point connection 104A–104D, such as the industry standard I2C (IIC) serial bus. As also illustrated, an analog multiplexer 106 (analog mux) may be provided along with a controller 107, e.g., an 8584 IC, to establish the connection to the SPCN processor 102. Of course, the details of the electrical connections are subject to a number of modifications which would be within the knowledge of one skilled in the art, and the particular arrangement shown is merely an example of one possible configuration according to the invention.

Each PCI bridge circuit (PCIB) 103A–103D includes, for example, a 256 byte address space which is readable and writeable by SPCN and the IOP's located in slots under the PCI bridge. The PCI bridge circuit interface to SPCN is implemented with, for example, IIC slave support as a serial RAM device, SPCN providing IIC master capability. In this illustrated embodiment, each PCIB to SPCN interface is a point-to-point connection with a single master and a single slave, however other configurations are possible within the spirit of the invention. The illustrated configuration advantageously provides a simple and effective way of accomplishing the objectives of the invention.

Interface signals used implement a simple two-wire point-to-point IIC interface per PCI bridge chip (PCIB), providing data and clock signals for efficient communication between PCIB and SPCN.

Since each bridge circuit (PCIB chip) 103A–103D is hardwired to a fixed IIC address according to the exemplary illustrated embodiment, only one PCIB chip 103A–103D per IIC bus 104A–104D may be connected to SPCN. As mentioned earlier, the interface in an exemplary embodiment is implemented with a serial RAM IIC master/slave protocol, which is known to one skilled in the art and will not be described in detail here. RAM initialization is implemented at system start-up, so that after a power on reset, all RAM locations in the SPCN range are set to zeroes.

As can be appreciated from the above, according to the illustrated exemplary embodiment, the SPCN/PCIB IIC interface logical protocol is implemented such that PCIB provides slave function as a serial RAM to IIC master function in SPCN. SPCN initiates all communications via reads and writes to a selected range of serial RAM addresses where a fixed address range is assigned to each PCI bus slot under the PCIB PCI bridge. In this example, the PCI bridge can accommodate 8 local buses, i.e., slots or "functions," for any combination of up to 8 IOP's and IOA's.

An example of PCIB RAM usage, i.e., how PCIB RAM is allocated, according to an exemplary embodiment of the invention, is set forth below:

| | | | |
|---|---|---|---|
| 00-0F | RRUB | rsv | tower/bd location for operating system |
| 10-1F | 8 command regs | 8 response regs | PCIB to SPCN |
| 20-2F | 8 command regs | 8 response regs | SPCN to PCIB |
| 30-3F | rsv | rsv | |
| 40-4F | | no RAM in this range | |
| 50-5F | | | |
| 60-6F | | | |
| 70-7F | | | |
| 80-8F | payload for F0 | payload for F1 | downstream |
| 90-9F | payload for F2 | payload for F3 | PCIB |
| A0-AF | payload for F4 | payload for F5 | to |
| B0-BF | payload for F6 | payload for F7 | SPCN |
| C0-CF | payload for F0 | payload for F1 | upstream |
| D0-DF | payload for F2 | payload for F3 | SPCN |
| E0-EF | payload for F4 | payload fpr F5 | to |
| F0-FF | payload for F6 | payload for F7 | PCIB |

The address range 00–0F is allocated to the computer operating system to correlate PCI boards and Frame ID (SPCN Tower address) to the logical address of the particular Host bus connected to this bridge, for example.

Address range 10–1F provides 8 command/response register pairs for the interface from PCIB to SPCN, while range 20–2Ser. No. F provides 8 command/response register pairs for the interface from SPCN to PCIB. This RAM is not read/write, but operates set bit/clear bit per mask.

Range 80-BF consists of 8—8 byte payloads for each command/response register pair in the interface from PCIB to SPCN, while range C0-FF consists of payloads for each command/response register pair in the interface from SPCN to PCIB. This is read/write RAM. Range 80-BF is therefore "downstream" i.e., PCIB to SPCN, while range C0-FF is "upstream" i.e., from SPCN to PCIB.

As already mentioned above, eight command registers and eight response registers are allocated to the interface for communication in each direction, i.e., upstream and downstream. These registers are allocated with two pair per PCIB slot. One pair is used for downstream communication (PCIB to SPCN) and the other pair is used for upstream communication (SPCN to PCIB). The downstream path is used for DASD concurrent maintenance according to the invention. The upstream path could be used for various other operations not pertinent to the present invention.

An exemplary PCIB RAM address map for this RAM usage is set forth below:

| | | |
|---|---|---|
| 00-0F | set bit RAM in this range | SPCN to OP SYS |
| 10-1F | write 0 to 00-3F is no-op | 8 cmd/resp regs for PCIB to SPCN |
| 20-2F | write 1 to 00-3F sets bit in 00-3F | 8 cmd/resp regs for SPCN to PCIB |
| 30-3F | | reserved |
| 40-4F | no RAM in this range | |
| 50-5F | write 0 to 40-7F is no-op | |
| 60-6F | write 1 to 40-7F clears bit in 00-3F | |
| 70-7F | | |
| 80-8F | read/write RAM | downstream |
| 90-9F | 8 byte payload per PCIB | PCIB |
| A0-AF | function for downstream | to |
| B0-BF | interface, PCIB to SPCN | SPCN |
| C0-CF | read/write RAM | upstream |
| D0-DF | 8 byte payload per PCIB | SPCN |
| E0-EF | function for upstream | to |
| F0-FF | interface, SPCN to PCIB | PCIB |

An exemplary PCIB to SPCN command/response format is shown below illustrating how shared RAM is allocated to a separate communication for each possible slot under the PCIB bridge chip (bit 0 is the most significant bit):

PCIB to SPCN command registers 10–17

| F0 | F1 | F2 | F3 | F4 | F5 | F6 | F7 |
|----|----|----|----|----|----|----|----|
| xxxx xxxx | xxxx xxxx | xxxx xxxx | xxxx xxxx | xxxx xxxx | xxxx xxxx | xxxx xxxx | xxxx xxxx |

01      7

↑→bits 1–7 of byte F0 = command code to SPCN
→bit 0 of byte F0: 1 = command valid (set by IOP, polled by SPCN)
→bit 0 of byte F0: 0 set to 0 by SPCN when response status loaded or operation timed out by IOP
→bit 0 of byte F0: 1/0 transition caused by SPCN creates interrupt to IOP

| F0 | F1 | F2 | F3 | F4 | F5 | F6 | F7 |
|----|----|----|----|----|----|----|----|
| xxxx xxxx | xxxx xxxx | xxxx xxxx | xxxx xxxx | xxxx xxxx | xxxx xxxx | xxxx xxxx | xxxx xxxx |

0      7

↑→bits F0 = response status to PCIB:

loaded by SPCN after command processed and before bit 0 of respective Function command in 10–17 is cleared by SPCN.

The exemplary SPCN to PCIB command response interface is like the PCIB to SPCN command response interface. The exemplary SPCN to PCIB command/response format is shown below:

SPCN to PCIB command registers 20–27

| F0 | F1 | F2 | F3 | F4 | F5 | F6 | F7 |
|----|----|----|----|----|----|----|----|
| xxxx xxxx | xxxx xxxx | xxxx xxxx | xxxx xxxx | xxxx xxxx | xxxx xxxx | xxxx xxxx | xxxx xxxx |

01      7

↑→bits 1–7 of byte F0 = command to PCIB
→bit 0 of byte F0: 1 = command valid (set by SPCN, interrupt to IOP)
→bit 0 of byte F0: 0 set to 0 by IOP when response status loaded by IOP or operation timed out by SPCN (polled by SPCN)
→bit 0 of byte F0: 1/0 transition caused by SPCN creates interrupt to IOP

| F0 | F1 | F2 | F3 | F4 | F5 | F6 | F7 |
|----|----|----|----|----|----|----|----|
| xxxx xxxx | xxxx xxxx | xxxx xxxx | xxxx xxxx | xxxx xxxx | xxxx xxxx | xxxx xxxx | xxxx xxxx |

0      7

↑→bits F0 = response status to SPCN:

loaded by IOP after command processed and before bit 0 of respective Function command in 20–27 is cleared by the IOP.

An exemplary method for concurrent maintenance according to an embodiment of the invention will now be described. First, an input/output processor (IOP) in PCI slot Fn receives a request for concurrent maintenance on one of the devices (e.g., a DASD) it controls from the operating system.

Next, the IOP builds parameters, e.g., SCSI address, timeout, and loads the parameters in the read/write RAM payload allocated for PCIB function n. Then the IOP sets the command, e.g., hex '81' for an SCSI remove command, into the command byte location allocated to downstream interface for PCIB function n. The IOP starts a timer for the operation. SPCN is continually polling RAM locations x'10–17' to detect command from the IOP's. Commands are detected by a 1 in the high order bit of a command byte, for example. SPCN reads the payload location associated with Fn, and executes the concurrent maintenance operation. On completion of the concurrent maintenance operation, SPCN loads response status in the downstream interface response byte allocated to Fn. After loading the response status code, SPCN clears the high order bit of the downstream command register allocated to Fn using a write to the respective address in the range 40–47 (i.e., 4n). Clearing the command bit causes an interrupt to the IOP. If no response is received from SPCN within an operation timeout, the IOP clears the command byte high order bit to cancel the operation.

Figure 2A:
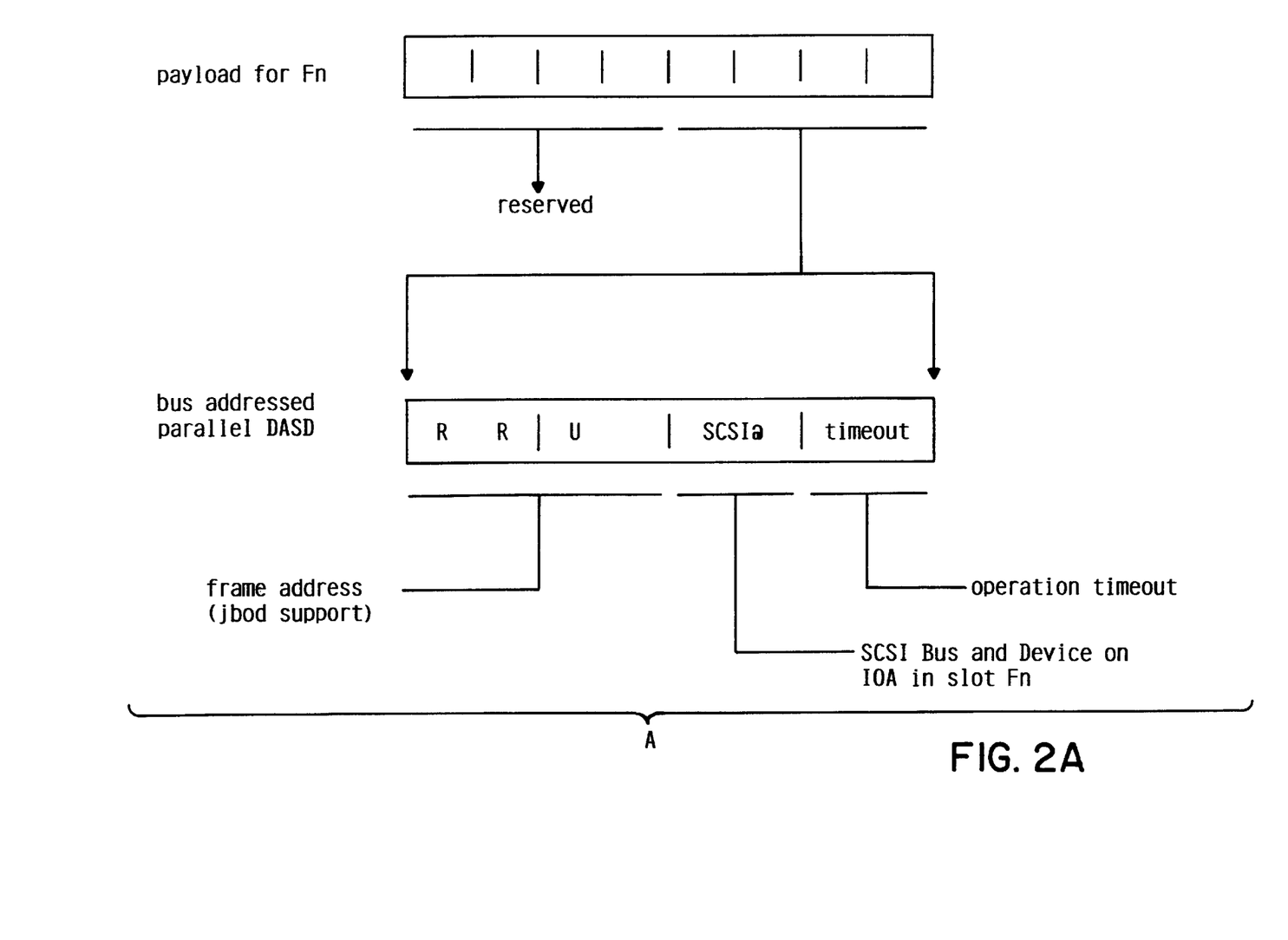
FIG. 2 illustrates the command protocol when the device is located using its SCSI address, according to the exemplary embodiment of the invention.
Figure 2B:
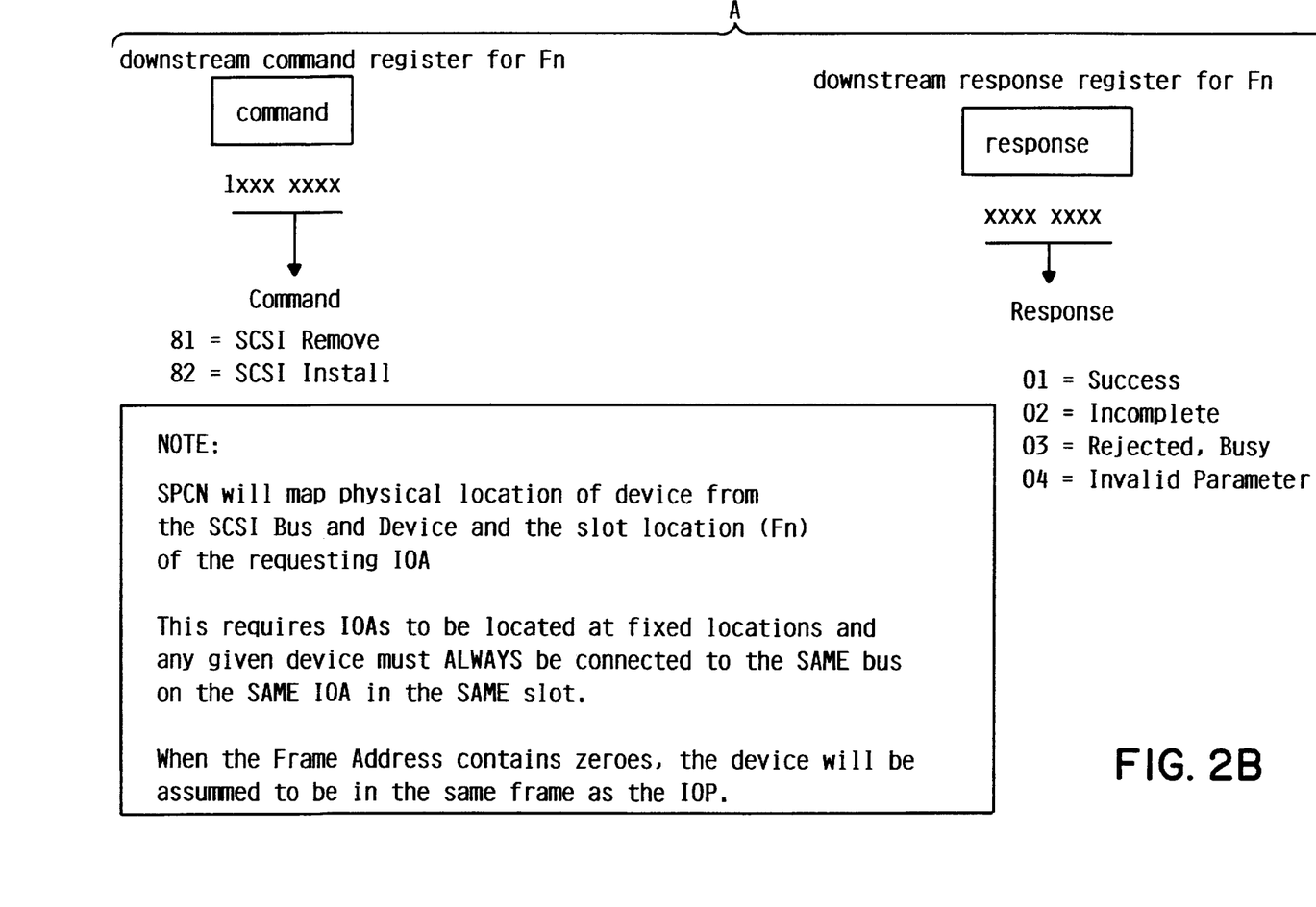
Figure 3A:
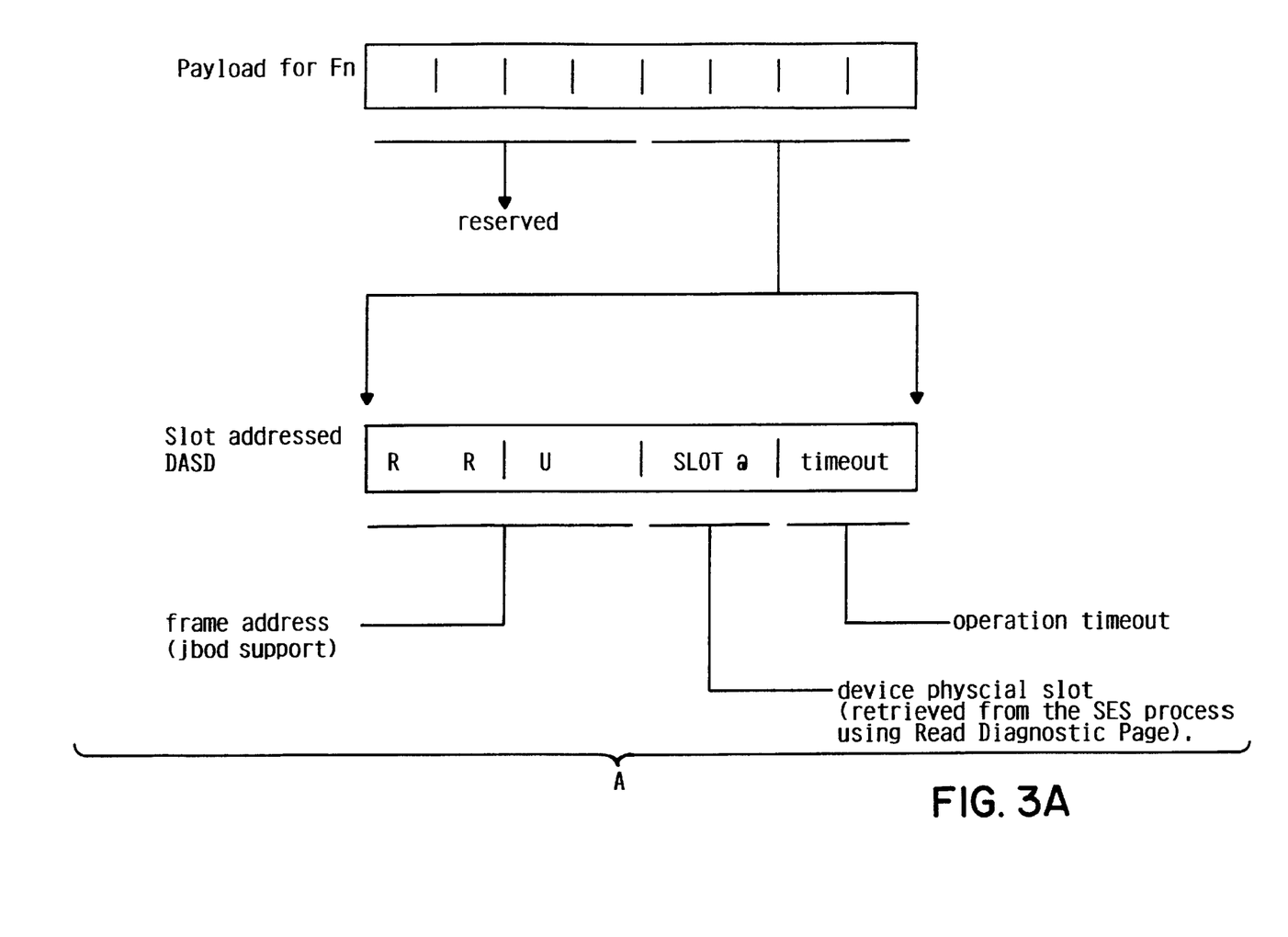
FIG. 3 illustrates the command protocol when the device is located using its slot address, according to the exemplary embodiment of the invention.
Figure 3B:
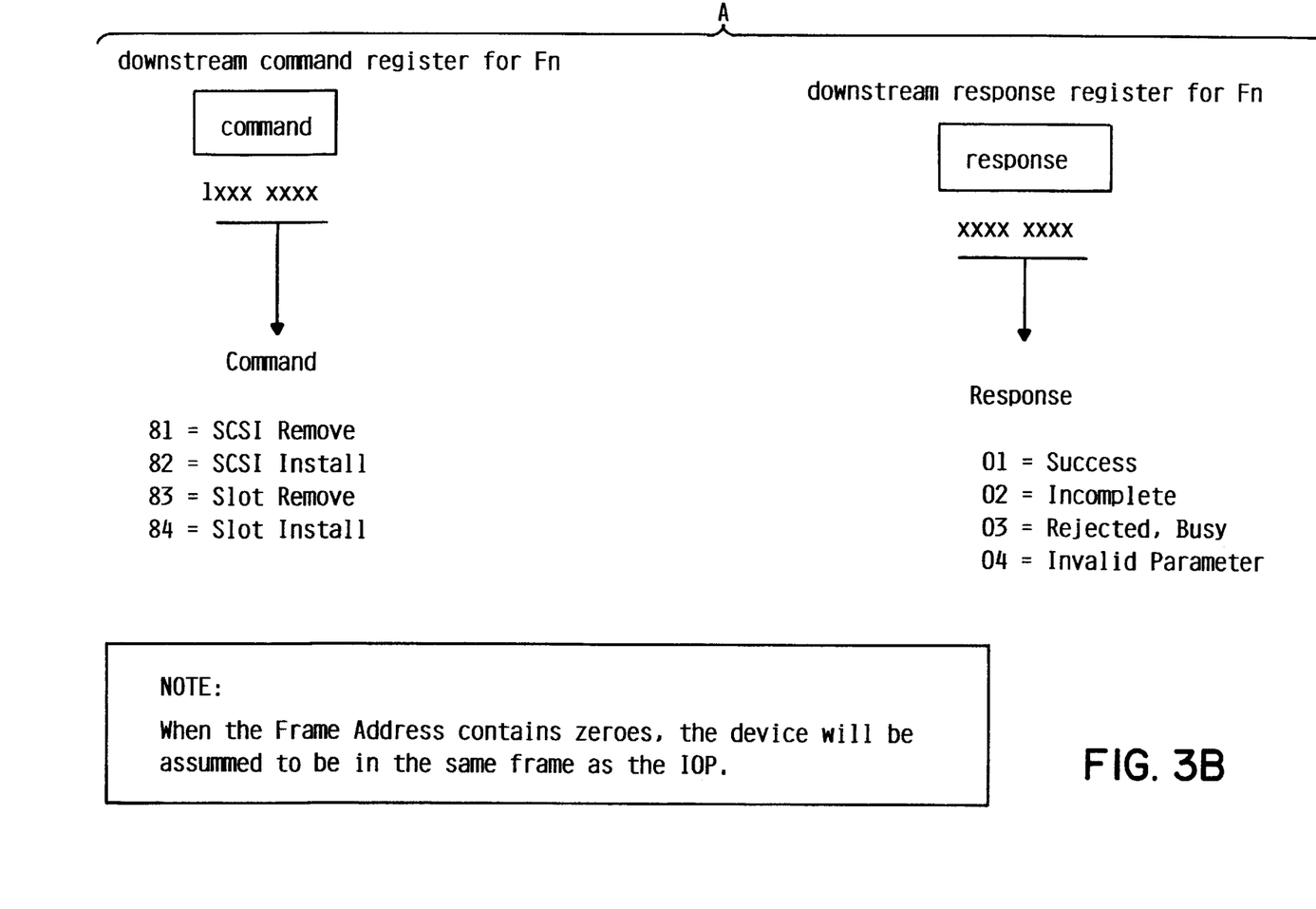

After receiving an operating system request for concurrent maintenance on a specific device, the IOP builds the command which will be loaded in the appropriate payload and command register as described above. FIGS. 2 and 3 illustrate this command format in the payload, and command and response registers.

FIG. 2 illustrates the command protocol when the device is located using its SCSI address, according to the exemplary embodiment of the invention and FIG. 3 illustrates the command protocol when the device is located using its slot address, according to the exemplary embodiment of the invention.

Before the command can be loaded, causing SPCN to detect it and turn off power, the IOP must quiesce the SCSI bus to which the selected device (DASD) is connected. The SCSI bus is temporarily quiesced so that the act of powering the device (DASD) on and off, and the act of removal and installation, will not disturb other activity on the SCSI bus, and so that there is no potential for the insertion of a replacement device (DASD) to cause voltage transients that may also cause errors in other devices.

The bus is quiesced for a matter of seconds and is limited because if bus activity is stopped too long, it will drive the operating system into error recovery which is of course undesirable. Consequently, both the IOP and SPCN time the operation, and that is the purpose of the time value "timeout" passed to SPCN in the commands illustrated.

Figure 4:
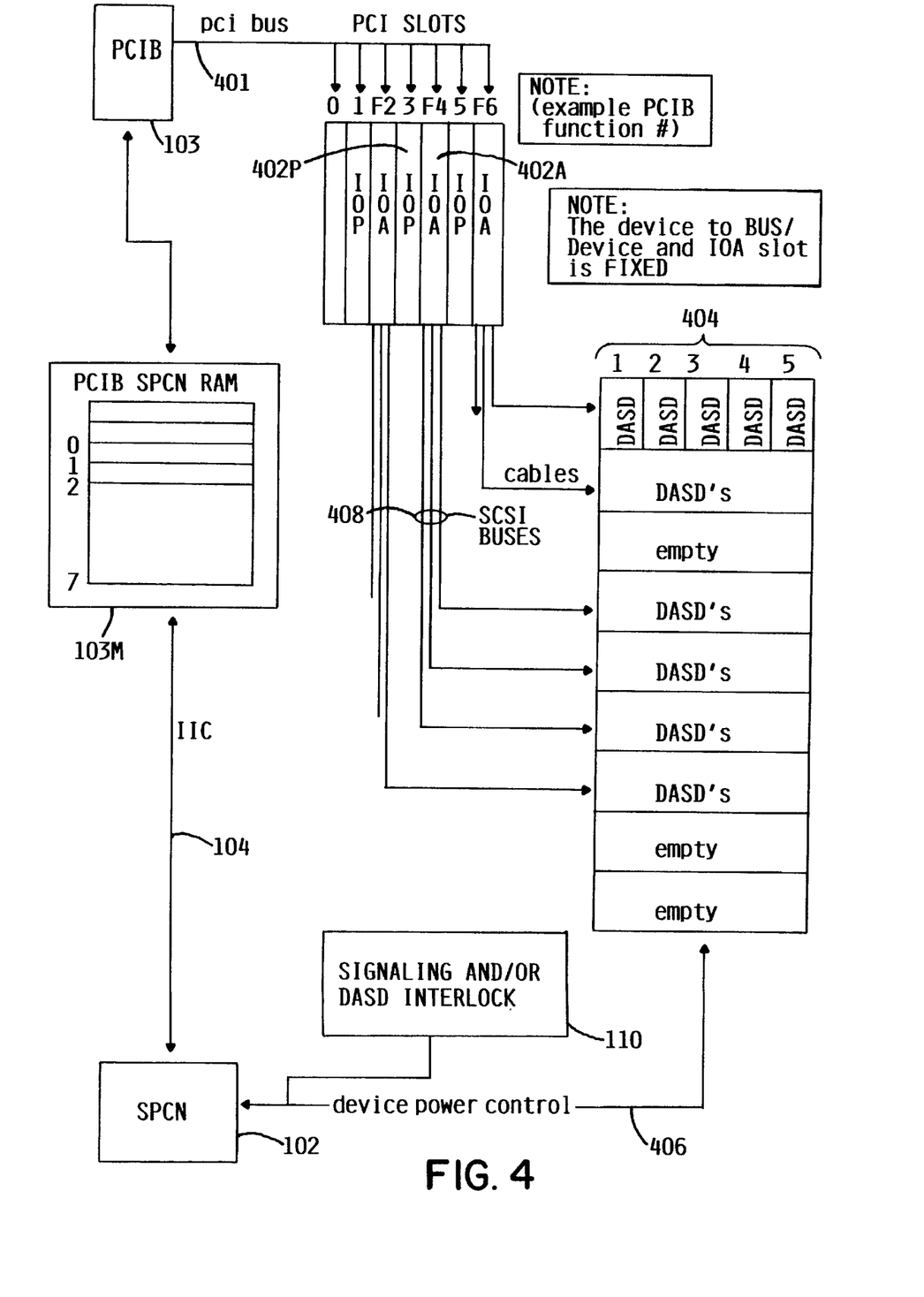
FIG. 4 illustrates parallel SCSI concurrent maintenance in accordance with the exemplary embodiment of the invention.

There is another aspect to the operation and this is illustrated using FIG. 4 which shows the complete path. That aspect is the way in which SPCN knows which device to turn off. FIG. 4 illustrates parallel SCSI concurrent maintenance in accordance with the exemplary embodiment of the invention. SPCN 102 is connected to PCIB (PCI bridge chip) 103 having RAM 103M through which PCIB and SPCN communicate, as described above. The PCIB 103 is coupled by PCI bus 401 to PCI slots which contain one or more input/output adapters (IOA's, e.g., 402A) and associated input/output processor (IOP, e.g., 402P). The IOA's connect through backplane wiring or cables, e.g., SCSI buses 408, to peripheral devices 404, e.g., DASD's. In the illustrated system of FIG. 4, item 408 represents a plurality of buses, e.g., three SCSI buses, leading from one IOA to a number of DASD's, e.g., five DASD's each. Power to the devices 404 is controlled by SPCN through device power control lines 406. As illustrated, an IOA (e.g., 402A) in a PCI slot may be coupled to one or more peripheral devices 404. FIG. 4 illustrates a typical configuration, however, the invention is not limited to the particular architecture illustrated.

Typically, the devices, e.g., DASD's, are known to the computer system by their connection path, for example, by the I/O bus to which the IOP is attached, the IOA attached to the IOP, the SCSI bus sourced by the IOA, and finally, by the device address of the DASD on that SCSI bus. However, none of these addresses are visible or known to SPCN. As described before, SPCN has interfaces to each DASD slot to detect the insertion/removal of a device and the ability to control power to that DASD slot. However, to perform a concurrent maintenance operation, SPCN must know which DASD slot to control/monitor. This can be determined in the two exemplary ways which are illustrated by FIGS. 2 and 3.

As shown in FIG. 2, the IOP loads the SCSI bus address, i.e., which of the 3 busses on an IOA, and the Device address into the indicated field "SCSI@" in the payload. SPCN 102 has built-in knowledge of the interconnections from the SCSI bus in each IOA slot to the respective device. SPCN 102 determines the IOA requesting service from the shared register space, by which command register contains a command. That is, a command in the register allocated to slot 4 (F4), for example, indicates the IOA 402A connected to the three buses 408 is requesting concurrent maintenance. The SCSI address in the payload indicates which bus, and which device on that bus. SPCN will translate that to determine the appropriate slot to control and monitor. In order for this scheme to work, however, the connections from every particular bus in each PCI slot must be fixed, either by board wiring or by restricting the cables to a fixed configuration. This is necessary so that the correct device is turned off/on.

In an alternate approach, illustrated in FIG. 3, the IOP/IOA has knowledge itself of the device slot requiring service and it puts the slot address (SLOT@) directly in the payload. The method by which the IOP knows the slot address was the subject of the application referenced earlier, i.e., copending application Ser. No. 08/971,687 (attorney docket number RO997-154-IBM-108). In summary, SPCN told the DASD devices themselves, or a special SCSI target processor, called an SES device or processor, of the slot addresses of each device. The IOP communicated with each DASD device or SES device on each SCSI bus and retrieved from that device its slot address directly. This allowed the IOP to correlate SCSI BUS/Device address to slot address directly. This translation was unknown to SPCN and it was not necessary for SPCN to know about the translation because the IOP would directly ask for maintenance by DASD slot address directly.

Continuing with a maintenance operation, after SPCN detects the SCSI remove command, for example, it turns power off to the device, signals and/or unlocks the device with block 110, and watches for the device to be removed. If the device is removed, a successful response is returned. If the device is not removed before a timeout expires, then an unsuccessful response is returned. The IOP releases the bus, and the DASD operation resumes on this bus. The SCSI install operation is the reverse of the remove operation.

The SPCN can also use the PCIB RAM to pass device location, by enclosure ("frame" or "tower") and backplane, e.g., PCI backplane, as well as the PCI slot on the PCI backplane to the operating system. SPCN will assign the frame and backplane a unique number at start-up, and will reassign such when frames or backplanes are added or removed. PCI slot location is according to PCI slot address assignment within the PCI architecture. The details of this mechanism are not necessary for an understanding of this invention, and are the subject matter of copending application Ser. No. 08/971,687 (attorney docket number RO997-154-IBM-108) mentioned above. For the purposes of the present invention all that is relevant is that the SPCN have some way of uniquely identifying each device in the system, e.g., by its actual physical location, in order to coordinate the concurrent maintenance thereof.

In this regard, since an IOA can provide one or more SCSI buses, and each SCSI bus could have a plurality of DASD's connected thereon, the SCSI bus, and the device number/device slot on the SCSI bus also needs to be known by SPCN, and this information could also be gathered at start-up by SPCN. SPCN can map physical location of a device from the SCSI bus and SCSI device, and the slot location of the IOA requesting concurrent maintenance, for example. For the purposes of the invention, it is assumed that some way for the system power controller to identify devices requesting concurrent maintenance exists, but the invention is not necessarily limited to the particular way this is accomplished.

As mentioned earlier, according to an aspect of the invention, a single SPCN controller can advantageously control all the devices within an enclosure, i.e., a frame or tower, resulting in a substantial cost reduction over other arrangements using system enclosure services (SES) processors. In order to achieve desired performance of DASD devices, the number of DASD's connected to a single SCSI bus is limited, for example, to five DASD's. An enclosure containing forty-five DASD's, for example, would therefore have nine SCSI buses. In other arrangements using SES processors, nine such processors would be required for the enclosure. According to this aspect of the invention, the functions performed by these nine SES processors are performed by one SPCN controller. This is illustrated in FIG. 4. Each of the three illustrated IOA/IOP combinations, e.g., IOP 402P and IOA 402A, controls three SCSI buses, e.g., SCSI buses 408. Each of the SCSI buses is in turn coupled to five of the DASD's in the nine banks of DASD's 404. In this exemplary enclosure arrangement therefore, forty-five DASD's are driven with nine SCSI buses and three IOA/IOP combinations. The three IOA/IOP combinations are connected to the one PCI bridge chip (PCIB) 103 through the PCI bus 401. In this way, one SPCN controller 102 can control concurrent maintenance for the forty-five DASD's in the enclosure communicating with all the IOA/IOP combinations through a single interface 104 to the PCI bridge (PCIB) 103. Such an arrangement achieves a substantial cost savings over other arrangements using SES processors, as would be readily apparent to one skilled in the art.

It will be apparent to one skilled in the art that the manner of making and using the claimed invention has been adequately disclosed in the above-written description of the preferred embodiments taken together with the drawings.

It will be understood that the above described preferred embodiments of the present invention are susceptible to various modifications, changes, and adaptations, and the same are intended to be comprehended within the meaning and range of equivalents of the appended claims.

For example, the invention is not limited to a mid-range or high-end computer system, but could have applicability to any electrical system. While described in the context of concurrent maintenance of DASD's on SCSI buses, concurrent maintenance of any other type of system component could of course be accomplished with the invention. The exemplary embodiment described above used a system power control network (SPCN), however, any system power controller or system enclosure services device (SES) with similar capabilities could be substituted therefore.

The embodiment described above included a first communications path to the DASD through the SCSI bus from the input-output adapter (IOA) which was connected by a PCI slot to a PCI bus on a PCI backplane having a PCI bridge circuit (PCIB) bridging the backplane PCI bus to a system or host PCI bus, however, the invention is not limited to this particular first communications path configuration.

Further, the described embodiment uses a second communications path from SPCN to an PCIB chip RAM, through which concurrent maintenance information is communicated between the IOA and the SPCN, however, the invention is not limited to this particular second communications path. The invention comprehends any second communications path which provides the advantages mentioned above, e.g., the first communications path between the device needing service and its adapter is not required to be operational to perform concurrent maintenance operations and non-compliance with standards for the first communications path are avoided.

As disclosed, the second communication paths from a number of bridge chips are multiplexed, however the invention is not limited to this particular implementation. All of the bridge chips could be connected to a single interface, each chip having a unique address for communication therewith.

What is claimed is:

1. In an electrical system having a system power controller and at least one system component coupled to the electrical system by a first communications path having a input/output adapter thereon, a method comprising:
    enabling concurrent maintenance of the at least one system component by exchanging concurrent maintenance message signals between the input/output adapter and the system power controller over a second communications path different from the first communications path, so that the system power controller thereby controls power to the system component subject to concurrent maintenance.

2. The method according to claim 1, wherein the enabling comprises:
    building a concurrent maintenance command message including a command and device parameters;
    storing the concurrent maintenance command message;
    reading the stored concurrent maintenance command message with the system power controller; and
    executing the concurrent maintenance command with the system power controller.

3. The method according to claim 2, wherein the system further has a bus bridging circuit in the first communication path and the second communications path, the bus bridging circuit storing the concurrent maintenance command message from the input/output adapter for the system power controller.

4. The method according to claim 3, further comprising storing responses from the system power controller to the input/output adapter in the bus bridging circuit.

5. The method according to claim 1, wherein the electrical system includes a plurality of system components, input/output adapters, and bus bridging circuits, there being a plurality of second communications paths, the method further comprising multiplexing respective concurrent maintenance command messages from the input/output adapters to the system power controller.

6. An apparatus for enabling concurrent maintenance of a system component coupled by a first communication path to an electrical system, wherein the first communication path includes a system bus, a local bus and a bus bridge circuit bridging the local bus and the system bus, the apparatus comprising:
    a system power controller which controls power to the system component; and
    a second communication path which connects the system power controller and the bus bridge circuit, through which concurrent maintenance signals are communicated.

7. The apparatus according to claim 6, wherein the electrical system comprises a computer system, and wherein the local bus comprises a peripheral component interconnect (PCI) bus.

8. The apparatus according to claim 7, wherein the second communications path comprises a serial, two-wire, point-to-point, single master-single slave bus.

9. The apparatus according to claim 7, wherein the system component comprises a direct access storage device, the apparatus further comprising:
 a signaling device which indicates whether the direct access storage device is available for concurrent maintenance;
 a PCI interconnection board having at least one PCI slot connector; and
 an input/output adapter disposed in the at least one PCI slot connector, the input/output adapter providing a small computer system interconnect (SCSI) bus, the direct access storage device being connected to the small computer system interconnect bus.

10. The apparatus according to claim 9, wherein the bridge circuit comprises a random access memory, the bridge circuit and the system power controller communicating by reading and writing data and commands to and from the random access memory.

11. The apparatus according to claim 10, wherein the system power controller comprises a system power control network which controls the signaling device and power to the direct access storage device to enable concurrent maintenance operations.

12. A method of enabling concurrent maintenance in a computer system having at least one peripheral device coupled by a first bus to an input-output circuit, the input-output circuit coupled to a computer system host processor through a host bus and a host bus bridge circuit, the computer system further having a system power control network which controls power to each component of the computer system, the system power control network being interfaced to the at least one input/output circuit by a second different bus, the method comprising:
 signaling to the input/output circuit a request for concurrent maintenance from the computer system through the host bus and host bridge circuit;
 providing a concurrent maintenance message signal to the system power control network over the second bus, with the at least one input/output circuit and the host bridge circuit to enable the system power control network to power down the at least one peripheral device coupled thereto for concurrent maintenance.

13. The method according to claim 12, wherein the at least one peripheral device comprises at least one direct access storage device (DASD), wherein the first bus comprises a small computer system interconnect (SCSI) bus, wherein the host bus comprises a peripheral component interconnect (PCI) bus, wherein the at least one input/output circuit comprises at least one direct access storage device input/output adapter (IOA) connected to the host PCI bus through a PCI backplane having the host bridge circuit, the host bridge circuit interfacing with the system power control network on the second bus.

14. The method according to claim 13, wherein the second bus comprises a point-to-point, two-wire, single master-single slave, serial bus.

15. In a computer system having a system bus coupled to a plurality of backplanes, each backplane having a local bus connected to a plurality of slot connectors on the respective backplane and at least one bridge circuit bridging the system bus to the backplane local bus, at least some of the slot connectors having input/output adapters inserted therein, at least some of the adapters providing a communications path with a respective direct access storage device, an arrangement for enabling concurrent maintenance comprising:
 a system power control network to control power to components of the system, including direct access storage devices and their respective input/output adapters; and
 a communications path to the system power control network from each respective bridge circuit on each respective backplane of the system through which concurrent maintenance communications signals are passed.

16. The arrangement according to claim 15, wherein the communications path to the system power control network from each respective bridge circuit comprises:
 a respective serial bus connected to each bridge circuit;
 a multiplexer coupled to each respective serial, point-to-point, single-master single-slave, two-wire bus; and
 a bus controller connected to the multiplexer and to the system power control network.

17. The arrangement according to claim 16, wherein each bridge circuit comprises a random access memory readable and writeable by both the bridge circuit and the system power control network with the concurrent maintenance communications signals.

18. The arrangement according to claim 17, wherein each local bus comprises a peripheral component interconnect bus, and wherein each bridge circuit comprises a peripheral component interconnect bridge circuit.

19. The arrangement according to claim 18, wherein each of the input/output adapters providing a communications path with a respective direct access storage device comprise one of:
 a parallel small computer system interconnect bus; or
 a serial small computer system interconnect bus.

20. The arrangement according to claim 19, wherein the bridge circuit random access memory is further able to store information which can be used by the system power control network to uniquely identify computer system components by their physical location, including their enclosure, the backplane within the enclosure, and the slot on the backplane to which they are interfaced.

21. The arrangement according to claim 20, wherein the information stored in the random access memory further includes the small computer system interconnect bus to which a direct access storage device is connected, which device the direct access storage device is on the small computer system interconnect bus, and which direct access storage device slot the direct access storage device is located in.

22. The arrangement according to claim 21, wherein each respective serial bus comprises a point-to-point, single-master single-slave, two-wire bus which carries clock signals.

23. The arrangement according to claim 22, further comprising at least one of:
 signaling circuitry which indicates whether a direct access storage device is available for concurrent maintenance; and
 a direct access storage device interlocking mechanism which unlocks the direct access storage device for concurrent maintenance.

* * * * *